US009384174B1

United States Patent
Averitt et al.

(10) Patent No.: US 9,384,174 B1
(45) Date of Patent: *Jul. 5, 2016

(54) AUTOMATED SYSTEM FOR ASSISTING THE ARCHITECTURAL PROCESS

(71) Applicant: Visions Computer Imaging Systems Ltd.

(72) Inventors: John W. Averitt, Brooklyn, NY (US); Charles W. Williams, Carmel, NY (US); Ivan A. Starr, Long Island City, NY (US)

(73) Assignee: Visions Computer Imaging Systems Ltd., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,352

(22) Filed: Aug. 12, 2015

Related U.S. Application Data (63) Continuation of application No. 14/044,302, filed on Oct. 2, 2013, now Pat. No. 9,110,870, which is a continuation of application No. 11/736,376, filed on Apr. 17, 2007, now Pat. No. 8,578,262, which is a continuation-in-part of application No. 11/184,167, filed on Jul. 19, 2005, said application No. 14/044,302 is a continuation-in-part of application No. 10/085,115, filed on Mar. 1, 2002, now abandoned.

(Continued)

(51) Int. Cl.
G06F 17/30 (2006.01)
G06F 17/21 (2006.01)

(52) U.S. Cl.
CPC .................................. G06F 17/212 (2013.01)

(58) Field of Classification Search
CPC ... G06F 17/15; G06F 17/5004; G06F 17/212; G06T 17/212; G06T 19/00; G06T 2210/04
See application file for complete search history.

(56) References Cited

U.S. PATENT DOCUMENTS

| 6,088,625 | A | * | 7/2000 | Kellstrom, Jr. | .... G05B 19/4097 700/107 |
| 6,167,406 | A | * | 12/2000 | Hoskins | ............ G06F 17/30289 705/1.1 |
| 6,397,117 | B1 | * | 5/2002 | Burrows | ................. G06F 17/50 700/121 |

(Continued)

OTHER PUBLICATIONS

Bajanac et al, "The Implementation of INdustry Foundation Classes in Simulation Tools for the Building Industry", published: Jun. 1, 1997, publisher: eScholarship, pp. 1-9.*

(Continued)

*Primary Examiner* — Wilson Tsui
(74) *Attorney, Agent, or Firm* — Frost Brown Todd LLC (57) ABSTRACT

There is disclosed an automated system for assisting the architectural process on an open-network. The system may include a data entry means for user-selected project features and at least one catalog database from which the user-selected feature is identified. The system may further incorporate filtering means for providing a graphical interface with filtered data associated with a user-selected feature, at least one user database which stores a unique identifier of the user-selected feature, automated selection means for incorporating data associated with the user-selected feature into at least one document, and generation means for creating an architectural document, such as a specification, detail, or schedule. The system may include at least one remote catalog database from which the user-selected feature is identified. Included are tracking the architectural process, querying a user database or a group of user databases, and generating Industry Foundation Class tags for industry compatibility searching.

5 Claims, 11 Drawing Sheets

Related U.S. Application Data (60) Provisional application No. 60/793,311, filed on Apr. 19, 2006, provisional application No. 60/589,047, filed on Jul. 19, 2004, provisional application No. 60/272,327, filed on Mar. 1, 2001.

(56) References Cited

U.S. PATENT DOCUMENTS

| | | | | |
|---|---|---|---|---|
| 6,993,708 B1* | 1/2006 | Gillig | ....................... | G06F 17/50 715/234 |
| 2002/0026385 A1* | 2/2002 | McCloskey | ............. | G06F 17/50 705/26.8 |
| 2002/0035408 A1* | 3/2002 | Smith | .................. | G06F 17/5004 700/97 |
| 2002/0103557 A1* | 8/2002 | Land | .................. | G05B 19/4097 700/96 |
| 2002/0107673 A1* | 8/2002 | Haller | .............. | G05B 19/41805 703/1 |
| 2004/0068485 A1* | 4/2004 | Thompson | .............. | G06F 17/50 |

OTHER PUBLICATIONS

Liebich T, "Exchanging IFC Content Information, Using the XML Protocol", published: Sep. 2000, publishe: ISTforCE, pp. 1-2.*

* cited by examiner

AUTOMATED SYSTEM FOR ASSISTING THE ARCHITECTURAL PROCESS

CROSS REFERENCE TO RELATED APPLICATIONS

This application is a continuation of U.S. patent application Ser. No. 14/044,302, filed on Oct. 2, 2013, which was itself a continuation of U.S. patent application Ser. No. 11/736,376, filed on Apr. 17, 2007, which application was itself a non-provisional of application 60/793,311, filed on Apr. 19, 2006 and was a continuation in part of U.S. patent application Ser. No. 11/184,167, filed on Jul. 19, 2005, which was itself a non-provisional of application 60/589,047, filed on Jul. 19, 2004 and was also a continuation in part of U.S. patent application Ser. No. 10/085,115 filed on Mar. 1, 2002, which itself was a non-provisional of application 60/272,327, filed on Mar. 1, 2001. The disclosures of each of the above identified applications are hereby incorporated by reference in their entireties.

FIELD OF THE INVENTION

The present invention pertains to systems for supporting the architectural process, and more particularly, to an open-network system for managing the architectural process.

BACKGROUND OF THE INVENTION

The typical process by which architects and engineers are hired and do their work includes many steps. For example, an owner develops a concept that describes a proposed building's use and approximate size. He then engages an architect. The architect hires the required engineers, and the team produces a design and a contract document in keeping with the concept and budget. This contract document may be composed of computer-generated drawings and written schedules and specifications. Taken together, these documents may represent all physical and cost aspects of the complete building. Currently, the graphics software used in this process is industry specific; however, the text software is general business.

The aspects of the contract document, including the detail, specification, and schedule, are then bid by general contractors and after some revisions, may be subsumed into a contract between the owner and the contractor. The architect observes the construction for compliance with the design.

The architect's prime interest lies in the conceptualization and design development phases. The creation of the aspects of the contract document, however, including the detail, specification, and schedule development, as well as their coordination, requires highly technical expertise and precision, and is considered drudgery by many. These tasks often suffer due to lack of time, interest, or sufficient experience. In fact, these tasks are often performed by junior members of the firm who lack the experience to do them efficiently, and thus they require extensive supervision by senior members of the firm. Shortcomings in the final document may result in project cost overruns for the owner and hours of unanticipated work for the architect.

In view of this, several chronic problems exist in the architectural, engineering and construction industry. One is the backbreaking amount of detail work required of the professionals, along with ever shrinking schedules, resulting in higher stress, higher costs, and lower incomes. Another is the difficulty and time-consuming process of obtaining manufacturer's information as it is needed. Compounding these problems is the existence of only a few options for automating any portion of the architectural design development process. This industry is one of the least automated of all industries.

Architects and engineers are hired to design buildings and other structures. In order to get these structures built, the architects and engineers produce what is called a contract document, which comprises several complimentary aspects, including the agreement between the owner and the contractor; the drawings, which include plans, elevations, sections, and details; schedules which list attributes of repetitive building parts such as doors, windows, hardware, and finishes; and the specifications, which are the written, detailed descriptions of the materials and processes that make up the building. A schedule, for example, would indicate to a contractor what type of finish a door might have, and a specification would indicate how that finish is applied.

At present, these aspects are created primarily manually and independently of one another. That is, each one requires its own input and execution, and the coordination between each is done manually by the architect and engineer. Each of these aspects has its own characteristics. Some are project specific and others are simply modifications or variations of a standard detail.

The system of the present invention automates the architectural process. Plans, elevations, and sections are project specific, but a majority of details, which are the graphic description of the assembly of construction elements, are standard, with some variation from project to project. For example, a floor plan is unique to a particular project, and therefore needs to be drawn for that project. However, a door or window detail, which is the drawing that shows how the unit fits into a particular wall, can be generalized and therefore used on any project that has those same conditions.

In preparing aspects of the contract document, including drawings and specifications, architects and engineers rely on production tools, such as computer programs, and information, such as manufacturers' literature. Architects and engineers perform tasks at the levels of output; that is, they produce aspects of a contract document in their final form; there is no intermediate input form process that they use. A schedule, which is a device used by architects and engineers to provide detailed information about a door, window, room finish, or the like, are created for each item in a computer-aided design (CAD) format or in spreadsheet form where each cell is populated manually. A detail, which is a drawing that shows the actual assembly of parts, is drawn one line at a time, or alternatively, by retrieving and modifying old files. A specification is prepared by modifying a previous specification or using a database or word processing-based template.

The production tools that attempt to assist with more than one aspect of the contract document do not do so automatically in that the process of generating a second aspect, if available at all, requires additional steps beyond a single entry of information into the system. Such additional steps may include downloading a detail library and separately selecting generic details that may additionally require modification to reflect the various features desired. Thus, the drawing, specifying, and product selection are three distinct processes that are currently disconnected and not automated.

More recently, for specifications, a program using an actual user interface that is not in a word processing format has been available. This program utilizes a directory tree structure. Also available is a program that uses a database format user interface where text is viewed in a database cell.

The present invention advances the automation of the architectural process. The system provides for a single entry of information for assembling the data required and for generating the aspects of the contract document used by architects and engineers.

SUMMARY OF THE INVENTION

The present invention relates to an open-network system for managing the architectural process. A user, usually at a location remote to the database of the system, may use a graphical user interface (GUI) to input data that is assembled to generate the aspects of a contract document for a project. The contract document may include specifications, details, and schedules.

The user may select features in designing the architectural project, and as appropriate, is provided with choices that satisfy the criteria of the features selected from one or more sources, such as a manufacturer's catalogue. In addition to providing specific information to the various aspects of the contract document, this selection and filtering aspect of the invention provides a time, and therefore, cost-savings for the project by quickly providing information to the user that traditionally an architect or engineer may spend many hours trying to uncover. Additionally, by filtering the choices applicable for a selected set of features of a design part, and providing the user with information about that part in a form that is used in generating the aspects of the contract document automatically, errors may be significantly diminished or eliminated. The process may be further facilitated by providing the user with an image, which may be a portion of an image map. In this way, the user may choose parts by clicking on the image. The data associated with that part may then populate the input form and aspects of the contract document, as appropriate.

The invention may comprise data entry means for user-selected project features, at least one catalogue database from which the user-selected feature is identified, filtering means for providing a graphical user interface with filtered data associated with a user-selected feature, automated selection means for incorporating data associated with the user-selected feature into at least one aspect, and generation means for creating the aspect. The process may be further facilitated by providing the user with an image, which may be a portion of an image map. In this way, the user may choose parts by clicking on the image. The data associated with that part may then populate the input form and aspects of the contract document, as appropriate. The aspects may be the specification, detail, schedule, status of the architectural process, or the like. The data entry means may be a graphical user interface having text entry and drop-down menu choices.

The system may include at least one remote catalogue database from which the user-selected feature is identified. The filtering means may provide the drop-down menu choices of the graphical user interface with filtered data associated with a user-selected feature.

The system of the present invention may further include means for tracking the architectural process. The invention may also include searching means for querying a user database or a group of user databases. The aspect created by the generation means may include Industry Foundation Class tags for industry compatibility. This may be, for example, in extensible markup language (XML), or other suitable form, such as object-oriented files.

The present invention may utilize an input form to gather design information about an architectural project or part of a project for assembly and placement in the aspects of the contract document, including, but not limited to, a schedule, specification, detail, or the like, as appropriate. The system may allow multiple tasks to be performed with a single entry of information. One embodiment of the invention further includes a module for tracking the status of the design process.

Accordingly, it is an object of the present invention to provide a system that enables architects and engineers to integrate their most basic and time-consuming tasks into one task.

Another object of the present invention is to provide a system that enables architects and engineers to generate multiple aspects of the contract document with a single entry of information.

A further object of the present invention is to provide a system to automate the creation of multiple aspects of the contract document.

Still another object of the present invention is to provide a system with resources for preventing errors in creating a contract document.

Yet another object of the present invention is to provide a system that allows for faster completion of a contract document.

These and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 6 presents a view of the user's options for editing a specification document from the preview function.

DETAILED DESCRIPTION OF THE INVENTION

The architectural process by which architects and engineers are hired to do their work typically begins with an owner developing a concept that describes a proposed building's use and approximate size. The owner then usually engages an architect. The architect may hire the required engineers, and the team may produce a design and a contract document, in accordance with the concept and budget.

The contract document may include a number of documents that make up the various aspects, such as computer-generated drawings and written schedules and specifications. Taken together, these documents may represent all of the physical and cost aspects of the complete building. General contractors may then bid on the aspects of the contract document. After some revisions, these aspects may be subsumed into a contract between the owner and the contractor. The architect may observe the construction to ensure compliance with the design.

The architect's prime interest may lie in the conceptualization and design development phases. The creation of the aspects of the contract document, however, including the detail, specification, and schedule development, as well as their coordination, may require highly technical expertise and precision, and may be considered drudgery by many. These tasks often suffer due to lack of time, interest, or sufficient experience. In fact, these tasks are often performed by junior members of the firm who lack the experience to do them efficiently, and thus they require extensive supervision by senior members of the firm. Shortcomings in the final document may result in project cost overruns for the owner and hours of unanticipated work for the architect.

The system of the present invention uses an open network to facilitate the exchange of information and provide single entry input forms for the user. The system integrates four modules that may function simultaneously to provide the desired output. The four modules may consist of a Schedule Module, a Detail Module, a Specification Module, and a Manufacturer's Module.

Figure 1:
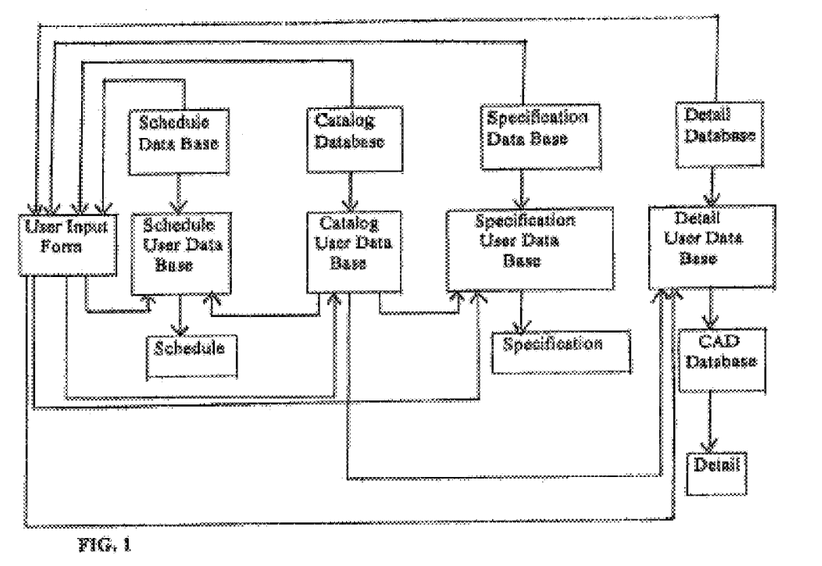
FIG. 1 presents a pictorial view of the flow of data amount of the schedule, Detail, Specification, and Manufacturer Modules.

FIG. 1 shows the flow of data among the modules. A Schedule Module assembles data for and generates schedules, which may list attributes of repetitive building parts such as doors, windows, hardware, finishes, and the like. A Detail Module assembles data for and draws one or more construction details. The drawing may show the actual assembly of parts. A Specification Module assembles data for and generates one or more specifications for the contract document, which may consist of the written, detailed descriptions of the materials and processes that make up the building. A Manufacturer's Module may import product catalogues into the system, and when a product is selected, the system may automatically enter its data into the other three modules. For example, when the manufacturer and project-specific data about one window is entered, the system may automatically enter that data, as appropriate, in the window schedule, select and draw the appropriate detail for that window, and select and write the appropriate specification sections for that window.

A module, such as for example, the Detail Module, may comprise a utility for creating the parts of a drawing from existing drawing parts, such as those in CAD format. A collection utility of the Detail Module may collect the drawn representations of the parts, and also the parameterized dimensions and descriptive names for the parts, and assemble the information into a database.

A diagram utility may create a parts diagram for a detail. The diagram may be created from a series of vector equations that comprise the geometry of the parameterized parts of the detail. The diagram utility may have two interfaces. A human interface may allow for the detail part to be drawn or previewed before being drawn. A program interface may allow other programs to create a detail from the information in the database.

Figure 2:
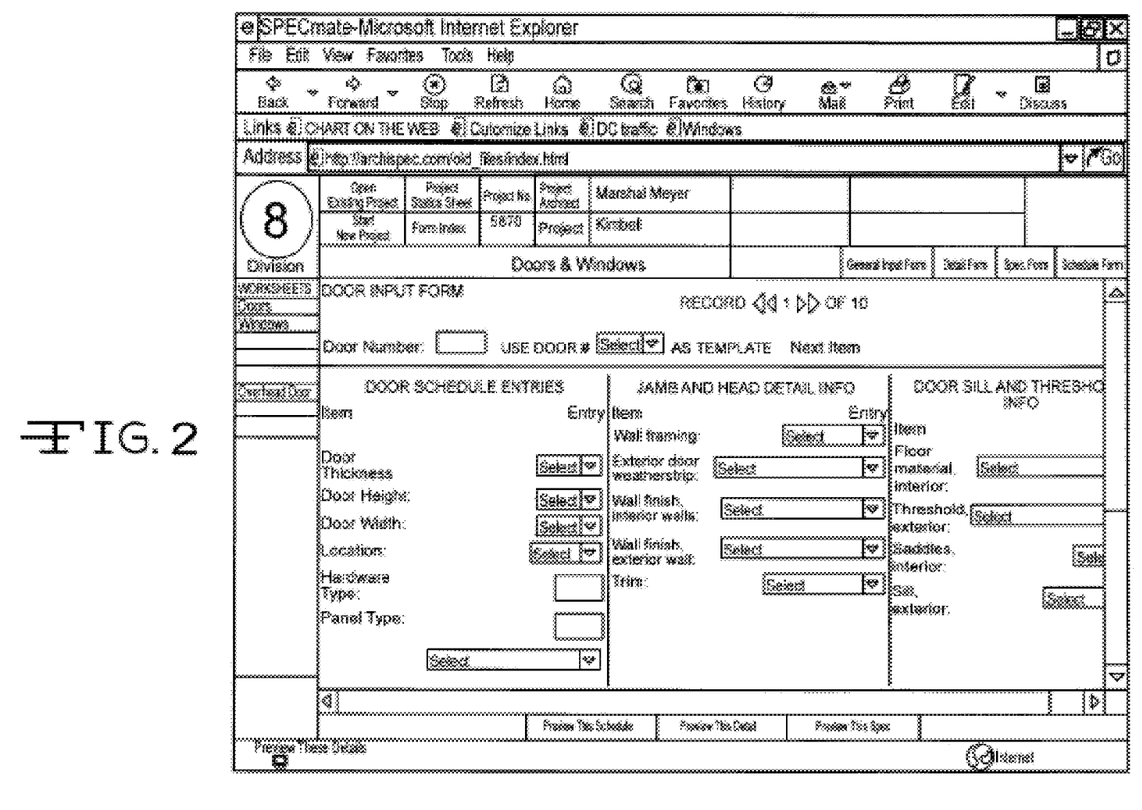
FIG. 2 presents a sample input form for doors.

FIG. 2 shows a sample input form for doors. User Input Forms may be organized by divisions, schedules, and specification sections, including the data needed to generate those documents. The input form is specific for each category of work, such as doors, windows, ceramic tile, flooring, and the like, so it may be readily visible on a computer screen in as many screens as necessary. In this way, the schedules, product selections, specifications, and details may all be developed for each category from one form. Once input, data may follow different data paths.

The user may select some of the data from drop-down boxes. These user selections may be stored in a user database for retrieval when the schedule is generated for preview or saved for download. This data may be used for only a single output document, such as the schedule, specification, or detail, for a combination of documents, or for all three documents.

The user may key in some of the data into input boxes. As with the drop-down selections, these selections may also be stored in a user database for retrieval when the aspects are generated for preview or saved for download.

Some of the data that is selected from drop-down boxes by the user may open a manufacturer's catalogue page from which the user may select a catalogue item. The attributes of that item may populate the input form and may be stored in the user database for retrieval when a schedule, specification, or detail is generated for preview or saved for download. This data may be assembled for generation of one or more of the various aspects of the contract document.

If the item selected from the catalogue page is a drawing, such as an item available in a *.dwg format, then it may be included in the detail for that item. For example, a manufacturer's stock detail for a window may be inserted into a window detail for a specific project based on the other user selections, as described below for drawing data.

The user may select a template for a drawing from a drop-down box on the User Input Form. The user may then select parts from a list in one or several drop-down boxes. These selections may be stored in a user database. When the detail is generated for preview or download, the information is assembled from the database and the detail may be drawn using the template the parts selected. Parts selected from a manufacturer's catalogue could also be selected and assembled into the detail.

The user may select data from drop-down boxes. These selections may be stored in a user database and may be retrieved with the specification is previewed or generated for download. This data may be used only for a specification, for a specification and a schedule, for a specification and a detail, or for all three. The system may automatically associate the stored data with the appropriate aspects of the contract document and assemble the data into the aspects at the user's request.

In some embodiments, all of the above data paths may work simultaneously. The work maybe previewed at any time, in any format. Any one or all documents may be generated. All documents may be automatically stored for future download. All documents may be saved in a format selected by the user; for example, the documents may be saved in .dwg, .dxf, .rtf, .doc, .wpf, .xls, or other formats.

The user database may function as a switching device that stores all the selected items and their associated unique identifiers. It may also include industry-acceptable tags such as Industry Foundation Class tags. When the user requests that the various documents be generated, the system may query the user database and generate the documents.

The information may represent all possible input choices, including, but not limited to, user input text and user-selected choices from the drop-down menus related to one or more catalogue databases. This text may be associated with unique identifiers that are stored in memory and unique identifiers may be compared with the information in the catalogue databases. This comparison may provide the basis for filtering choices that appear on the user's screen as the user continues on that worksheet. This feature may assist in preventing errors based on mistake or ignorance by providing only a set of options acceptable in the industry relative to the selected choice.

Any data input into the system, whether related to the design or other project aspects, such as that from the project status input form, from user text, from user selections, or imported from other digital forms, may be stored in memory. This data may be assembled with data from catalogue databases, such as manufacturer databases, to generate any number of outputs, including, but not limited to, a specification, detail, schedule, or status of the architectural process. The outputs may be in an industry-standard format, such as XML, which may be necessary to enable contractors and maintenance persons to search the system.

In systems of the present invention, the data required for developing the schedules, though unique for each project, may be used to link a specification, schedule, and detail together. This may be particularly advantageous because in most cases, this is the one step in the process that architects take, regardless of whatever else they draw or what specifications they write.

Along those lines, it should be noted that a building is usually designed from the outside in, or from the general to the specific. The plans and elevations, which are pictures of the sides of a building, are usually the first to be designed with the sections and details to follow. If an architect runs out of time in developing the aspects of the contract document, the details and specifications may suffer for lack of adequate attention, for in general, these items are lowest on an architect's priority list. Therefore, it may benefit the architect greatly to have these tasks automated as much as possible.

Figure 3:
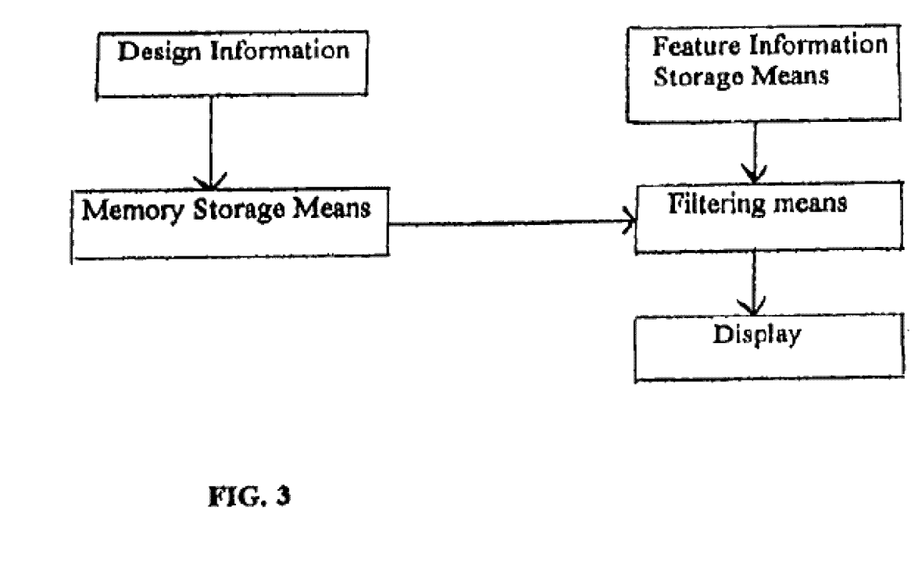
FIG. 3 presents a flow chart showing how information travels during an initial session in which a user keyboards and selects choices at the GUI.

FIG. 3 depicts a flow of information during an initial session of a user keyboarding and selecting choices at the GUI. In one embodiment, this GUI is the scheduler form. The design information represents all possible input choices, such as user input text and user selected choices from the drop-down menus related to one or more catalogue databases (i.e., the feature information storage means). This text may be associated with unique identifiers that are stored in the memory storage means and the unique identifiers are compared with the information in the catalogue databases. This comparison may provide the basis for filtering choices by the filtering means that may appear on the user's display as the user continues on the particular worksheet.

Figure 4:
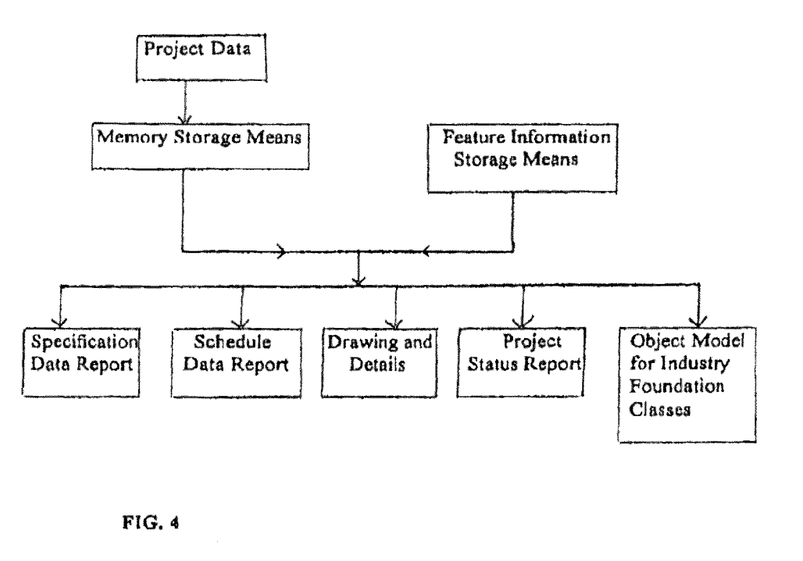
FIG. 4 presents a diagram of the overall flow of data for generating output.

FIG. 4 shows the overall flow of data for generating output. Any data input into the system, whether related to the design or other project aspects, such as using the project status input form, and from user text, from user selections, or imported from other digital forms, is stored in memory. This data may be assembled with data from the catalogue databases, including the manufacturer databases, to generate one or more outputs, including a specification, detail, schedule, and status of the architectural process. The outputs may be in an industry-standard format, such as XML, which may be necessary to enable contractors and maintenance persons to search the system.

Figure 5:
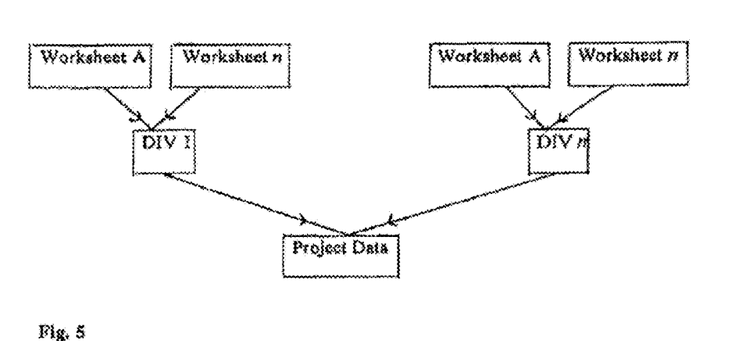
FIG. 5 presents a breakdown of the data input that makes up the project data.

FIG. 5 presents a breakdown of the data input that makes up the project data (as shown in FIG. 3). In particular, each division may be made up of data combined from several worksheets, and in turn, the combination of divisions may make up the project data. This may include imported, rather than input data.

Figure 7:
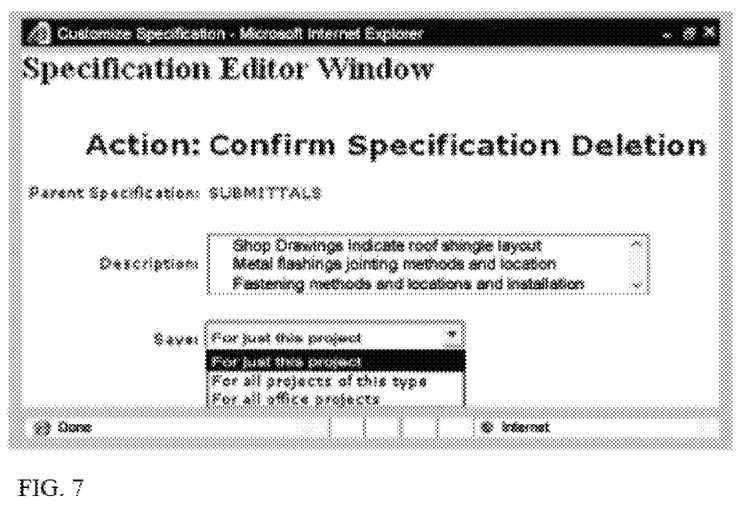
FIG. 7 presents a view of the user's options for saving edits to a specification document.

Embodiments of the system may further allow the user to edit specification documents online. Referring to FIGS. 6 and 7, the user may edit a specification via the preview function. The user may save edits per project, per project type, or per office standard. Accordingly, the user may store practice knowledge and the changes may appear in subsequent documents for new projects.

Figure 8:
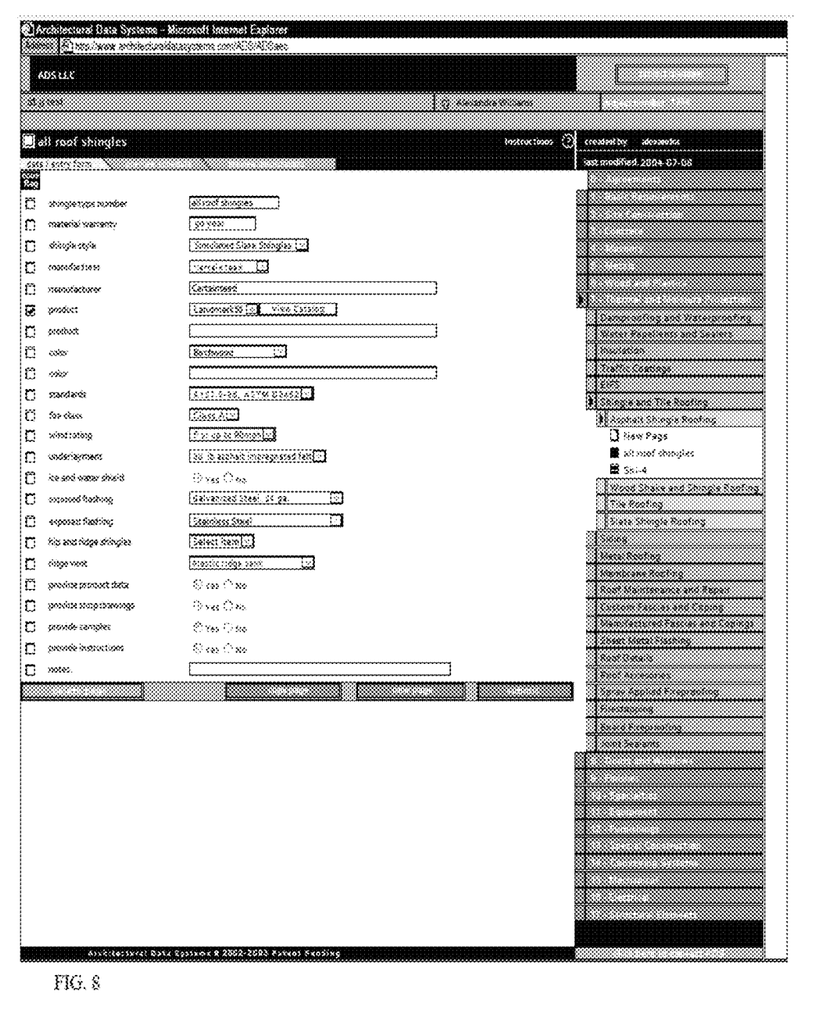
FIG. 8 presents a snapshot of an input screen from which a user may elect to flag items.

As shown in FIG. 8, embodiments may allow the user to flag items that need additional work, which may reduce the time needed to review a document and resume progress in a subsequent session. The user may be able to check or flag a label on a data entry form. The flagging may then appear on the division menu. The system may be further configured to reflect the flagged status in worksheets, subworksheets, and pages. The user may add notations to the flagged items that may provide an explanation as to why the user flagged the item.

Figure 9:
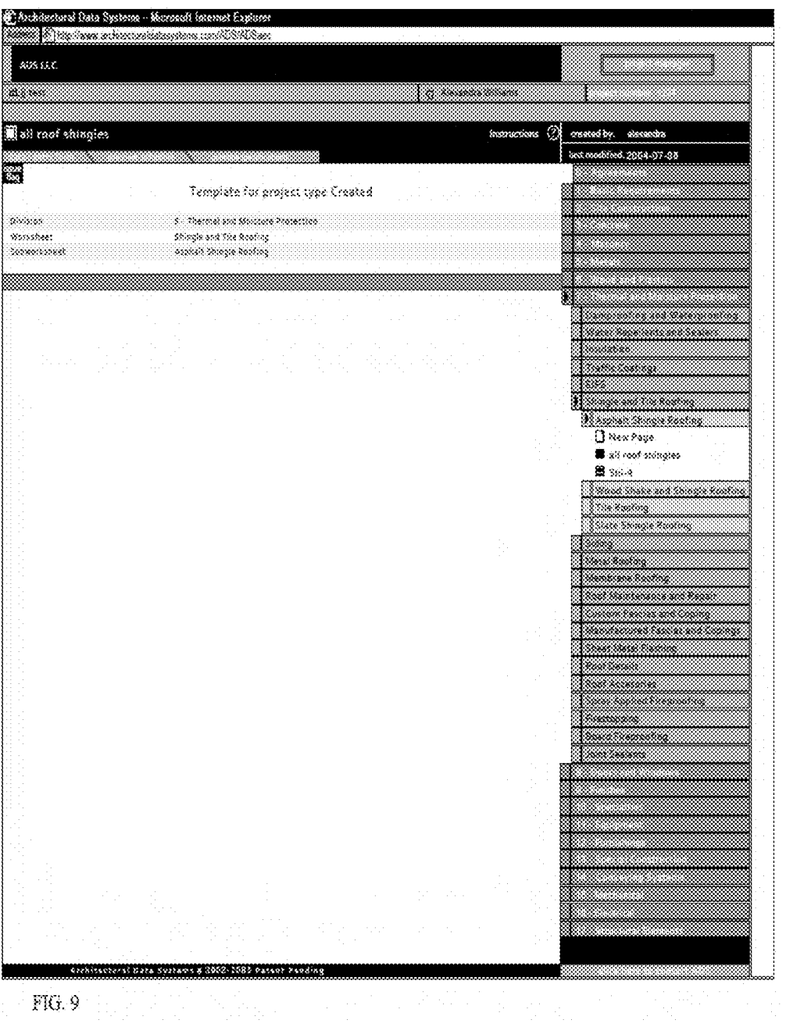
FIG. 9 presents a view of a screen that allows a user to identify and save a data input form as a template.

Turning to FIG. 9, the system may provide the user with the ability to identify and save a data input form as a template. For instance, a worksheet may be saved as a template for a certain type of project, for all office projects, or for all project types. This may provide another method for storing practice knowledge.

Figure 10:
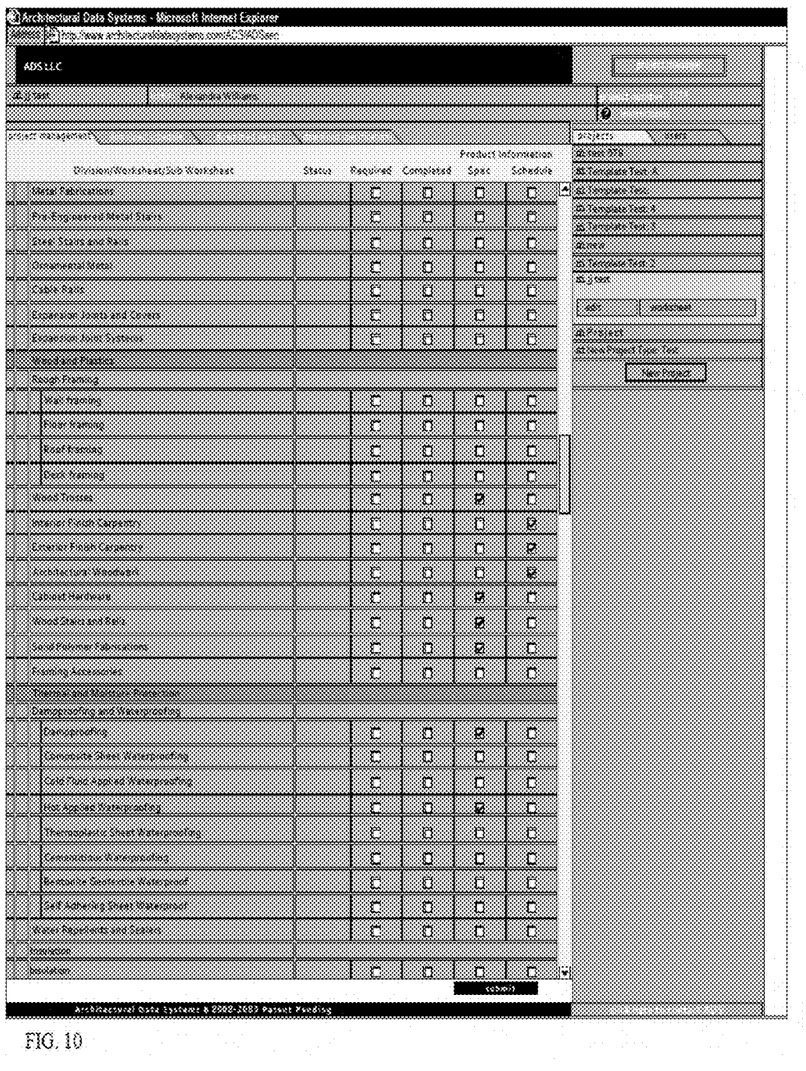
FIG. 10 presents a sample product management page that allows a user to select where product and/or material data is generated.

In addition, embodiments of the invention may provide the user with the ability to choose where product and/or material data is generated. The product and material data may be generated in either the specification or in the schedule. As shown in FIG. 10, the user may access the project management page for each project and make a selection. As a default, the product and material data may be generated in both the specification and the schedule.

Figure 11:
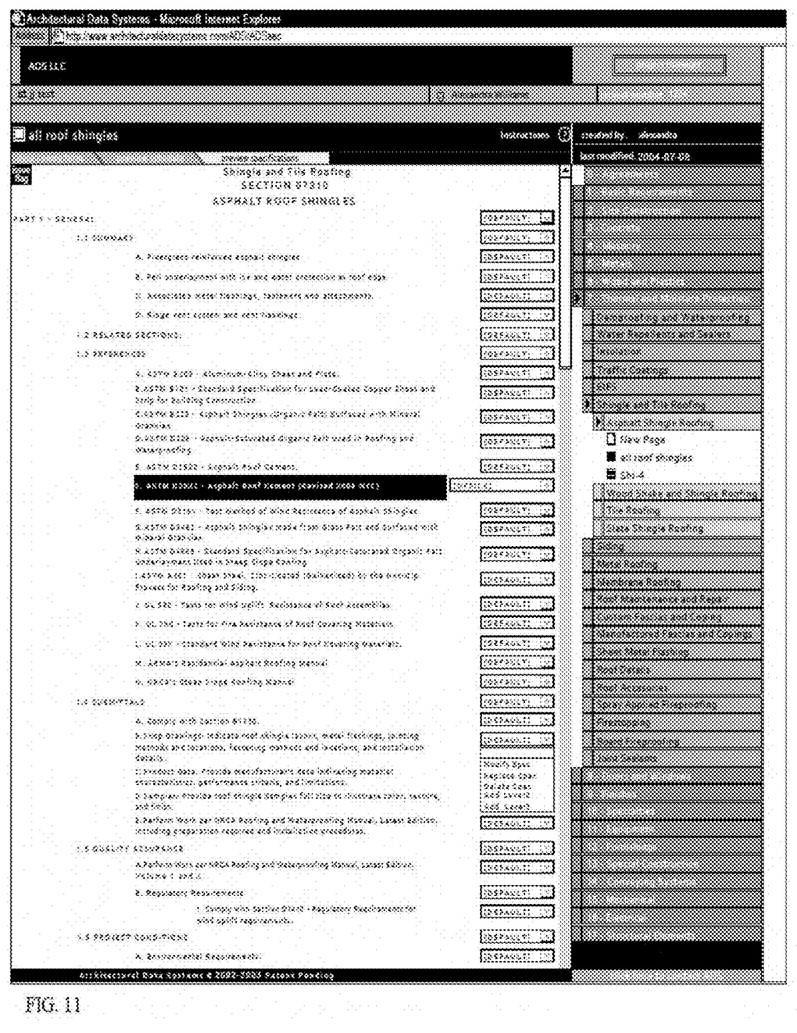
FIG. 11 presents a snapshot of a screen from which a user may elect to hide attribute columns in schedules or specifications.

Referring to FIG. 11, the system may further provide the user with the ability to hide attribute columns in schedules and specifications. This function may be accessible through the preview schedule function.

Embodiments of the system may include other supplementary features. For instance, the system may enable the user to create his or her own data entry forms and create his or her own specification section. The system may further allow a user to audit a project by viewing the work done. Through this feature, a project administrator may be able to see what work has been done, when the work was done, and who performed the work.

The system may also have the capability to change English units to metric units. The unit transformation may take place automatically or at the direction of a global command.

What is claimed is:

1. A computer implemented method for automating generation of an architectural contract document for a building, the method comprising using a computer comprising a processor and a computer readable storage medium having stored thereon a set of instructions operable to configure the computer to perform a set of acts, the set of acts comprising:

a) providing an architectural work category specific form to a user by sending, to a user computer, data operable to cause the user computer to display the architectural work category specific form, wherein the provided architectural work category specific form comprises a drop down box from a set of one or more drop down boxes and at least one additional data entry tool, wherein:

i) the at least one additional data entry tool is operable by the user to specify a value for a first attribute of an architectural feature corresponding to the architectural work category to which the provided architectural work category specific form is specific; and
ii) the drop down box is operable by the user to specify a value for a second attribute of the architecture feature corresponding to the architectural work category to which the provided architectural work category specific form is specific;
b) receiving a user specified value for the first attribute of the architectural feature from the at least one additional data entry tool;
c) associating the user specified value received from the at least one additional data entry tool with a unique identifier;
d) based on the user specified value for the first attribute, filtering choices for values of the second attribute of the architectural feature presented by the drop down box based on:
   i) comparing the unique identifier associated with the user specified value for the first attribute against items in one or more stored catalogs; and
   ii) defining, as the filtered choices for values for the second attribute, a set of values for that attribute for items in the one or more stored catalogs which comply with the user specified value for the first attribute;
e) sending, to the user computer, data operable to limit choices for the user to specify for the value of the second attribute of the architectural feature displayed by the drop down box to the filtered choices;
f) after receiving a selection of a choice from the filtered choices from the drop down box, providing a catalog page from the one or more stored catalogs for the user to select a catalog item compatible with the selected choice from the filtered choices to populate values for attributes of the selected catalog item into the architectural work category specific form;
g) based on selection of the catalog item, populating values for attributes of the selected catalog item into the architectural work category specific form;
h) generating an industry foundation class XML file based on:
   i) the values for attributes of the selected catalog item populated into the architectural work category specific form; and
   ii) the user specified value for the first attribute received from the at least one additional data entry tool;
i) a determining if the selected catalog item is in drawing format;
j) determining if a second selected catalog item is in drawing format;
k) generating a drawing comprising the architectural feature by performing a set of acts comprising:
   i) inserting into the drawing the selected catalog item when the selected catalog item was determined to be in drawing format; and
   ii) inserting into the drawing the second selected catalog item when the second selected catalog item was determined to be in drawing format.

2. The computer implemented method of claim 1, wherein the method further comprises:
a) allowing the user to request the automatic generation of multiple aspects of the architectural contract document, wherein the user is allowed to request a third aspect and also at least one of a first and second aspects, through selection from the group consisting of:
   i) the first aspect, the first aspect comprising a listing of attributes of the architectural feature;
   ii) the second aspect, the second aspect comprising a written detailed description of materials and processes related to including the architectural feature in the building; and
   iii) the third aspect, the third aspect comprising the drawing comprising the architectural feature; and
b) receiving the request and automatically generating the requested aspects of the architectural contract document.

3. The computer implemented method of claim 2, wherein:
a) automatically generating the requested aspects of the architectural contract document comprises propagating the data for the architectural feature received from the at least one additional data entry tool, and the selected catalog item's attributes into each of the aspects selected by the user; and
b) generating the drawing comprising the architectural feature is performed as part of automatically generating the requested aspects.

4. A system for automating generation of an architectural contract document for a building, the system comprising:
a) a user computer;
b) a server which comprises a non-transitory computer readable medium, which is located remotely from the user computer and which is configured to perform a set of acts comprising:
   i) providing an architectural work category specific form to a user by sending, to the user computer, data operable to cause the user computer to display the architectural work category specific form, wherein the provided architectural work category specific form comprises a drop down box from a set of one or more drop down boxes and at least one additional data entry tool, wherein the at least one additional data entry tool is operable by the user to specify data for an architectural feature corresponding to the architectural work category to which the provided architectural work category specific form is specific;
   ii) receiving data for the architectural feature from the at least one additional data entry tool;
   iii) associating the data received from the at least one additional data entry tool with a unique identifier;
   iv) based on the data for the architectural feature received from the at least one additional data entry tool, filtering choices for the architectural feature based on comparing the unique identifier associated with the data received from the at least one additional data entry tool against items in one or more stored catalogs identified by the architectural feature and retrieving as the filtered choices one or more items from the one or more stored catalogs that comply with the data for the architectural feature received from the at least one additional data entry tool;
   v) sending, to the user computer, data operable to limit choices displayed by the drop down box to the filtered choices;
   vi) based on receiving a selection of a choice from the filtered choices from the drop down box, providing a catalog page from the one or more stored catalogs for the user to select a catalog item to populate attributes of the selected catalog item into the architectural work category specific form;
   vii) based on selection of the catalog item, populating attributes of the selected catalog item into the architectural work category specific form;

viii) determining if the selected catalog item from the catalog page is in drawing format;
ix) allowing the user to request the automatic generation of multiple aspects of the architectural contract document, wherein the user is allowed to request a third aspect and also at least one of a first and second aspects, through selection from the group consisting of:
   A) the first aspect comprising a listing of attributes of the architectural feature;
   B) the second aspect comprising a written detailed description of materials and processes related to including the architectural feature in the building; and
   C) the third aspect comprising a drawing comprising the architectural feature;
wherein automatic generation of requested multiple aspects of the architectural contract document comprises:
   I) propagating the data for the architectural feature received from the at least one additional data entry tool, the selected choice from the filtered choices, and the selected catalog item's attributes into each of the requested multiple aspects; and
   II) generating the drawing using the data for the architectural feature received from the at least one additional data entry tool and inserting into the drawing of the third aspect, the selected catalog item when the selected catalog item was determined to be in drawing format.

5. A system for automating generation of an architectural contract document for a building, the system comprising:
a) a user computer;
b) a server which comprises a non-transitory computer readable medium, which is located remotely from the user computer and which is configured to perform a set of acts comprising:
   i) providing an architectural work category specific form to a user by sending, to the user computer, data operable to cause the user computer to display the architectural work category specific form, wherein the provided architectural work category specific form comprises a drop down box and at least one additional data entry tool, wherein:
     A) the at least one additional data entry tool is operable by the user to specify a value for a first attribute of an architectural feature corresponding to the architectural work category to which the provided architectural work category specific form is specific;
     B) the drop down box is operable by the user to specify a value for a second attribute of the architecture feature corresponding to the architectural work category to which the provided architectural work category specific form is specific;
   ii) receiving a user specified value for the first attribute of the architectural feature from the at least one additional data entry tool;
   iii) associating the user specified value received from the at least one additional data entry tool with a unique identifier tag;
   iv) based on the user specified value for the first attribute, filtering choices for values of the second attribute of the architectural feature presented by the drop down box based on:
     A) comparing the unique identifier associated with the user specified value for the first attribute against items in one or more stored catalogs; and
     B) defining, as the filtered choices for values for the second attribute, a set of values for that attribute for items in the one or more stored catalogs which comply with the user specified value for the first attribute;
   v) sending, to the user computer, data operable to limit choices for the user to specify for the value of the second attribute of the architectural feature displayed by the drop down box to the filtered choices;
   vi) providing a catalog page from the one or more stored catalogs for the user to select a catalog item compatible with the selected choice from the filtered choices to populate values for attributes of the selected catalog item into the architectural work category specific form;
   vii) based on selection of the catalog item, populating values for attributes of the selected catalog item into the architectural work category specific form;
   viii) determining if the selected catalog item from the catalog page is in drawing format;
   ix) allowing the user to request the automatic generation of multiple aspects of the architectural contract document, wherein the user is allowed to request a third aspect and also at least one of a first and second aspects, through selection from the group consisting of:
     A) the first aspect comprising a listing of attributes of the architectural feature;
     B) the second aspect comprising a written detailed description of materials and processes related to including the architectural feature in the building; and
     C) the third aspect comprising a drawing comprising the architectural feature;
   wherein automatic generation of requested multiple aspects of the architectural contract document comprises:
     I) propagating the user specified value for the first attribute, the selected choice from the filtered choices, and the values for selected catalog item's attributes into each of the requested multiple aspects; and
     II) generating the drawing by performing acts comprising, when the selected catalog item was determined to be in drawing format, inserting the selected catalog item into the drawing of the third aspect.

* * * * *